(12) United States Patent  
Watanabe et al.

(10) Patent No.: US 8,884,478 B2
(45) Date of Patent: Nov. 11, 2014

(54) COOLING STRUCTURE OF GENERATOR MOTOR AND GENERATOR MOTOR

(75) Inventors: Kouichi Watanabe, Hiratsuka (JP); Kouya Iizuka, Hiratsuka (JP); Takao Nagano, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/698,753

(22) PCT Filed: Mar. 26, 2012

(86) PCT No.: PCT/JP2012/057770
§ 371 (c)(1),
(2), (4) Date: Nov. 19, 2012

(87) PCT Pub. No.: WO2012/133322
PCT Pub. Date: Oct. 4, 2012

(65) Prior Publication Data
US 2014/0023484 A1    Jan. 23, 2014

(30) Foreign Application Priority Data

Mar. 31, 2011   (JP) ................................. 2011-080713

(51) Int. Cl.
*H02K 9/00*   (2006.01)
(52) U.S. Cl.
USPC .............................................. 310/52; 310/54
(58) Field of Classification Search
USPC ................................... 310/52, 54, 58, 59, 64
See application file for complete search history.

(56) References Cited

U.S. PATENT DOCUMENTS

| 3,459,979 A * | 8/1969 | Carew et al. .................... 310/54 |
| 5,889,342 A | 3/1999 | Hasebe et al. |
| 6,798,104 B2 * | 9/2004 | Kajiura et al. ................ 310/162 |
| 7,316,208 B2 | 1/2008 | Tanaka et al. |
| 7,911,091 B2 | 3/2011 | Takenaka et al. |
| 8,203,241 B2 | 6/2012 | Tanaka |
| 8,232,697 B2 | 7/2012 | Chiba et al. |

(Continued)

FOREIGN PATENT DOCUMENTS

| CN | 101627523 A | 1/2010 |
| DE | 112008000535 T5 | 12/2009 |

(Continued)

OTHER PUBLICATIONS

Office Action dated Jan. 22, 2014, issued for the corresponding German patent application No. 11 2012 000 030.7 and English translation thereof.

(Continued)

*Primary Examiner* — Hanh Nguyen
(74) *Attorney, Agent, or Firm* — Edwards Wildman Palmer LLP

(57) ABSTRACT

A cooling structure of a generator motor includes: a first passage provided to an end side member placed at one end of a housing of a generator motor, the first passage extending toward a rotation center axis of an input/output shaft housed in the housing, the first passage opening to a side of the input/output shaft, and the first passage including a restriction section halfway through; and a second passage provided to the end side member, branching off from the first passage at a position on an outer side in a radial direction of the input/output shaft than the restriction section and subsequently extending toward a rotor attached to an outside of the input/output shaft, and the second passage opening to a side of the rotor.

8 Claims, 11 Drawing Sheets

(56) References Cited

U.S. PATENT DOCUMENTS

| | | |
|---|---|---|
| 8,487,489 B2 * | 7/2013 | Palafox et al. .................. 310/52 |
| 2008/0024020 A1 * | 1/2008 | Iund et al. ....................... 310/61 |
| 2011/0001400 A1 | 1/2011 | Chiba et al. |
| 2011/0012448 A1 | 1/2011 | Tanaka |

FOREIGN PATENT DOCUMENTS

| | | |
|---|---|---|
| JP | 2007-077882 A | 3/2007 |
| JP | 2009-071905 A | 4/2009 |
| KR | 10-2010-0066432 A | 6/2010 |
| KR | 10-2010-0117647 A | 11/2010 |
| WO | WO-2009/110437 A1 | 9/2009 |

OTHER PUBLICATIONS

International Search Report dated May 29, 2012, issued for PCT/JP2012/057770.

* cited by examiner

A-A

COOLING STRUCTURE OF GENERATOR MOTOR AND GENERATOR MOTOR

FIELD

The present invention relates to cooling of a generator motor with a coolant.

BACKGROUND

A generator motor is used for various applications, but produces heat by Joule heating of a coil provided to a stator, the eddy-current and hysteresis losses of a rotor core, and the like. For example, a technology for cooling a generator motor using a coolant, such as oil, that serves as a lubricant and a cooling oil in order to cool a generator motor is disclosed (Patent Literature 1).

CITATION LIST

Patent Literature

Patent Literature 1: Japanese Patent Application Laid-open No. 2009-071905

SUMMARY

Technical Problem

If a generator motor is cooled with a coolant such as oil, variations may occur in the cooling states of portions to be cooled due to variations of the flow rates of coolants flowing through the passages of the coolants in the generator motor. Patent Literature 1 does not mention the unbalance in cooling, and is susceptible to improvement. An object of the present invention is to suppress variations of cooling states upon cooling of a generator motor with a coolant.

Solution to Problem

To achieve the object mentioned above, according to the present invention, a cooling structure of a generator motor comprises: a first passage provided to an end side member placed at one end of a housing of a generator motor, the first passage extending toward a rotation center axis of an input/output shaft housed in the housing, the first passage opening to a side of the input/output shaft, and the first passage including a restriction section halfway through; and a second passage provided to the end side member, branching off from the first passage at a position on an outer side in a radial direction of the input/output shaft than the restriction section and subsequently extending toward a rotor attached to an outside of the input/output shaft, and the second passage opening to a side of the rotor.

According to the present invention, the first passage includes: an inside first passage on the side of the input/output shaft; and an outside first passage placed on an outer side in the radial direction of the input/output shaft than the inside first passage, and having a larger inside diameter than the inside first passage, and the restriction section is between the inside first passage and the outside first passage.

According to the present invention, the first passage opens at a position at one end of the input/output shaft.

According to the present invention, the end side member includes: a through hole for attaching a power transmission member to the input/output shaft; and an overhanging portion extending toward the rotation center axis from an inner circumference of the through hole to a middle position in the radial direction of the input/output shaft in a manner of not overlapping with one end of the input/output shaft.

According to the present invention, in the generator motor, one end of the input/output shaft is coupled to an output shaft of a power generation source, and the other end of the input/output shaft is coupled to an input shaft of an object to be driven by power of the power generation source.

According to the present invention, the first passage opens at a position of a coupling portion at which the input/output shaft and the input shaft of the object to be driven are coupled.

According to the present invention, a generator motor comprises the cooling structure of a generator motor.

According to the present invention, a generator motor, provided between an internal-combustion engine and a hydraulic pump, for transmitting power of the internal-combustion engine to the hydraulic pump and generating electric power, the generator motor comprises: a first passage provided to an end side member placed at one end of a housing of the generator motor, the first passage extending toward a rotation center axis of an input/output shaft housed in the housing, the first passage opening to a side of the input/output shaft, and the first passage including a restriction section halfway through; and a second passage branching off from the first passage at a position on an outer side in a radial direction of the input/output shaft than the restriction section and subsequently extending toward a rotor attached to an outside of the input/output shaft, and the second passage opening to a side of the rotor, wherein the first passage includes an inside first passage on the side of the input/output shaft, and an outside first passage placed on an outer side in the radial direction of the input/output shaft than the inside first passage, and having a larger inside diameter than the inside first passage, and the second passage branches off from the outside first passage.

Advantageous Effects of Invention

The present invention can suppress variations of cooling states upon cooling of a generator motor with a coolant.

DESCRIPTION OF EMBODIMENTS

A detailed description will be given of a mode for carrying out the invention (embodiment) with reference to the drawings. The present invention is not limited by the contents described in the following embodiment. Moreover, elements described below include those that a person skilled in the art can easily assume and substantially identical ones. Furthermore, it is possible to combine the elements described below as appropriate. Moreover, various omissions, substitutions, or modifications of the elements can be made without departing from the gist of the invention.

<Hybrid Excavator>

Figure 1:
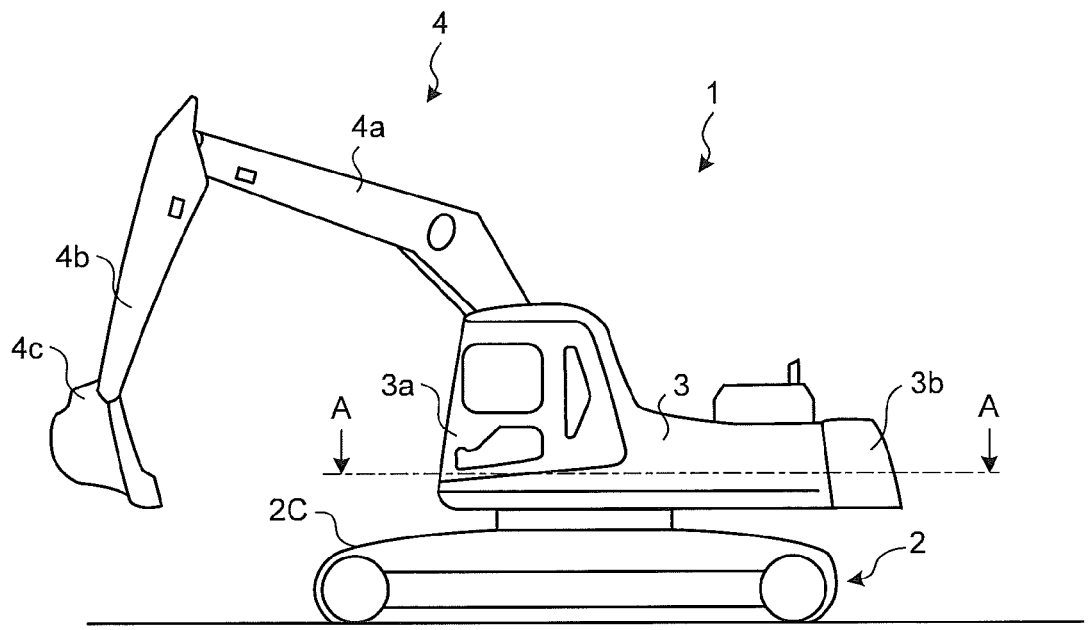
FIG. 1 is a side view illustrating a hybrid excavator using a generator motor according to an embodiment.
Figure 2:
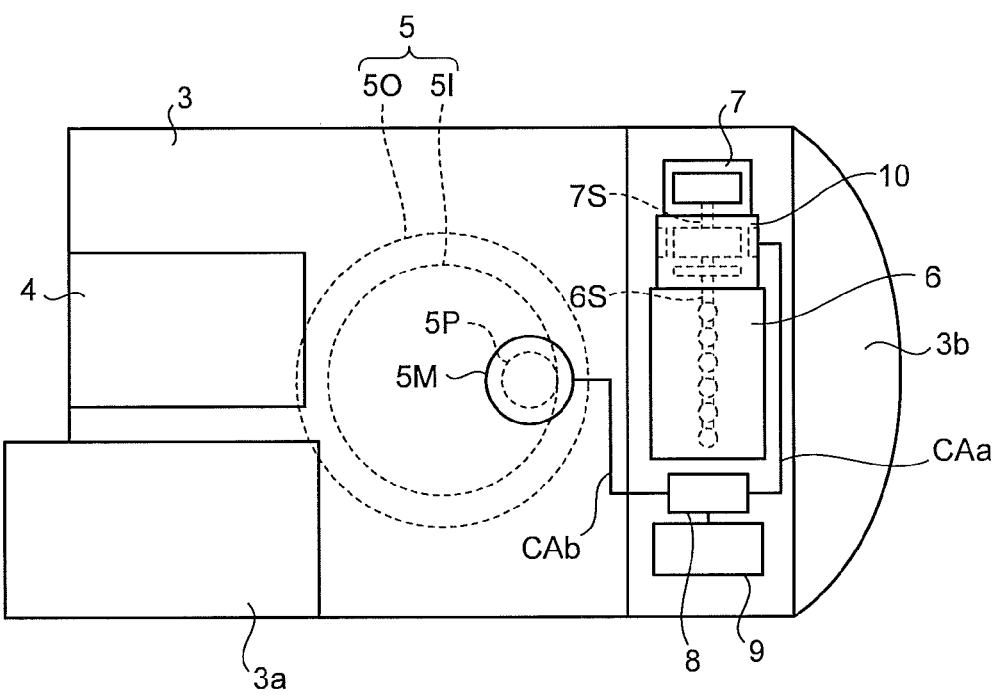
FIG. 2 is an arrow view A-A of FIG. 1.

FIG. 1 is a side view illustrating a hybrid excavator using a generator motor according to the embodiment. FIG. 2 is an arrow view A-A of FIG. 1. A hybrid excavator 1 is what is called a hybrid system construction vehicle that generates electric power by driving a generator motor by an internal-combustion engine, swings an upper structure by driving a motor by the electric power, and drives the auxiliary equipment of the hybrid excavator 1.

The hybrid excavator 1 includes an undercarriage 2 having a pair of left and right crawlers 2C, an upper structure 3, a working machine 4 including a boom 4a, an arm 4b, and a bucket 4c and attached to the upper structure 3, and a swing circle 5 connecting the undercarriage 2 with the upper structure 3. The pair of left and right crawlers 2C is driven by a right travel hydraulic motor and a left travel hydraulic motor to cause the hybrid excavator 1 to travel. The left and right travel hydraulic motors are supplied with hydraulic oil pumped from a hydraulic pump 7 illustrated in FIG. 2, and are driven.

The upper structure 3 is swung by a motor 5M (refer to FIG. 2) that functions as a swing motor. An outer race 50 of the swing circle 5 is secured to the upper structure 3. An inner race 51 of the swing circle 5 is secured to the undercarriage 2. With such a structure, the swing circle 5 connects the upper structure 3 with the undercarriage 2. An input/output shaft of the motor 5M is connected to a swing pinion 5P via swing machinery including a speed reduction mechanism. The swing pinion 5P meshes with internal teeth attached to the inner race 51 of the swing circle 5. The driving force of the motor 5M is transmitted to the swing pinion 5P via the swing machinery to swing the upper structure 3. In the embodiment, the motor 5M is installed such that the input/output shaft is oriented toward a direction in which gravity acts if placed in a vertical position, in other words, the hybrid excavator 1 is installed on a horizontal plane. The boom 4a, the arm 4b and the bucket 4c are driven by a boom 4a hydraulic cylinder, an arm 4b hydraulic cylinder, and a bucket 4c hydraulic cylinder via control valves, respectively, with hydraulic oil pumped from the hydraulic pump 7 illustrated in FIG. 2, and executes operations such as excavation.

The upper structure 3 is a substantially rectangular structure in planar view. A cab 3a of the upper structure 3 is placed on the left front of the upper structure 3 if the operator's main line of sight during the operation of the hybrid excavator 1 is set to the front. A counter weight 3b is placed on the rear of the upper structure 3. The upper structure 3 includes an internal-combustion engine 6 as a power generation source of the hybrid excavator 1, a generator motor 10 according to the embodiment, the hydraulic pump 7, an inverter 8, and a storage battery device 9 in addition to the cab 3a and the counter weight 3b.

The internal-combustion engine 6 is, for example, a diesel engine; however, the type of the internal-combustion engine 6 does not matter. The internal-combustion engine 6, the generator motor 10, the hydraulic pump 7, the inverter 8 and the storage battery device 9 are placed on the front of the counter weight 3b, in other words, on the cab 3a side. The generator motor 10 is placed between the internal-combustion engine 6 and the hydraulic pump 7. An output shaft 6S of the internal-combustion engine 6 is coupled to an input/output shaft of the generator motor 10, and the input/output shaft of the generator motor 10 is coupled to an input shaft 7S of the hydraulic pump 7. With such a structure, the internal-combustion engine 6 drives the generator motor 10 to generate electric power, and drives the hydraulic pump 7. In other words, the hydraulic pump 7 is driven via the generator motor 10. The generator motor 10 may be coupled indirectly to an output shaft of the engine via a PTO (Power Take Off).

A high voltage wire CAa electrically couples an input/output terminal of the inverter 8 to a power input/output terminal of the generator motor 10. A high voltage wire CAb electrically couples an output terminal of the inverter 8 to an input terminal of the motor 5M. The inverter 8 stores the electric power generated by the generator motor 10 in the storage battery device 9 such as a capacitor or secondary battery, and supplies the electric power to the motor 5M to drive this. Moreover, the inverter 8 stores in the storage battery device 9 the electric power obtained by the motor 5M converting the kinetic energy of the upper structure 3 into electric energy. The inverter 8 supplies the electric power stored in the storage battery device 9 to the motor 5M next time the upper structure 3 swings. The generator motor 10 receives the supply of electric power from the storage battery device 9 to operate as a motor, and can assist the internal-combustion engine 6 as necessary.

In this manner, the generator motor 10 according to the embodiment is applied to the hybrid excavator 1 being a kind of construction vehicle. An application target of the generator motor 10 is not limited to the hybrid excavator 1. For example, the generator motor 10 may set other hybrid construction machines such as a wheel loader as application targets.

<Generator Motor>

Figure 3:
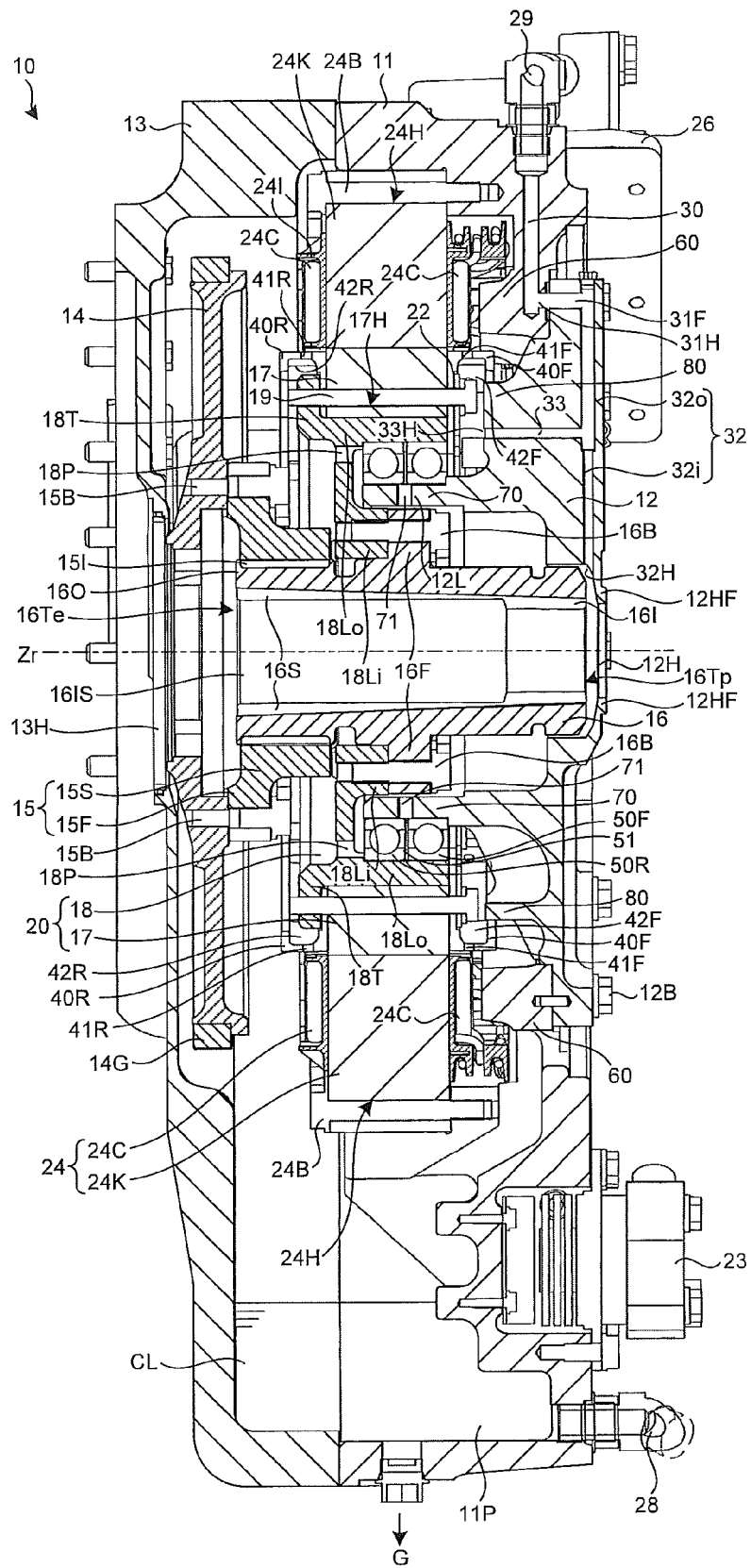
FIG. 3 is a cross-sectional view of the generator motor according to the embodiment.
Figure 4:
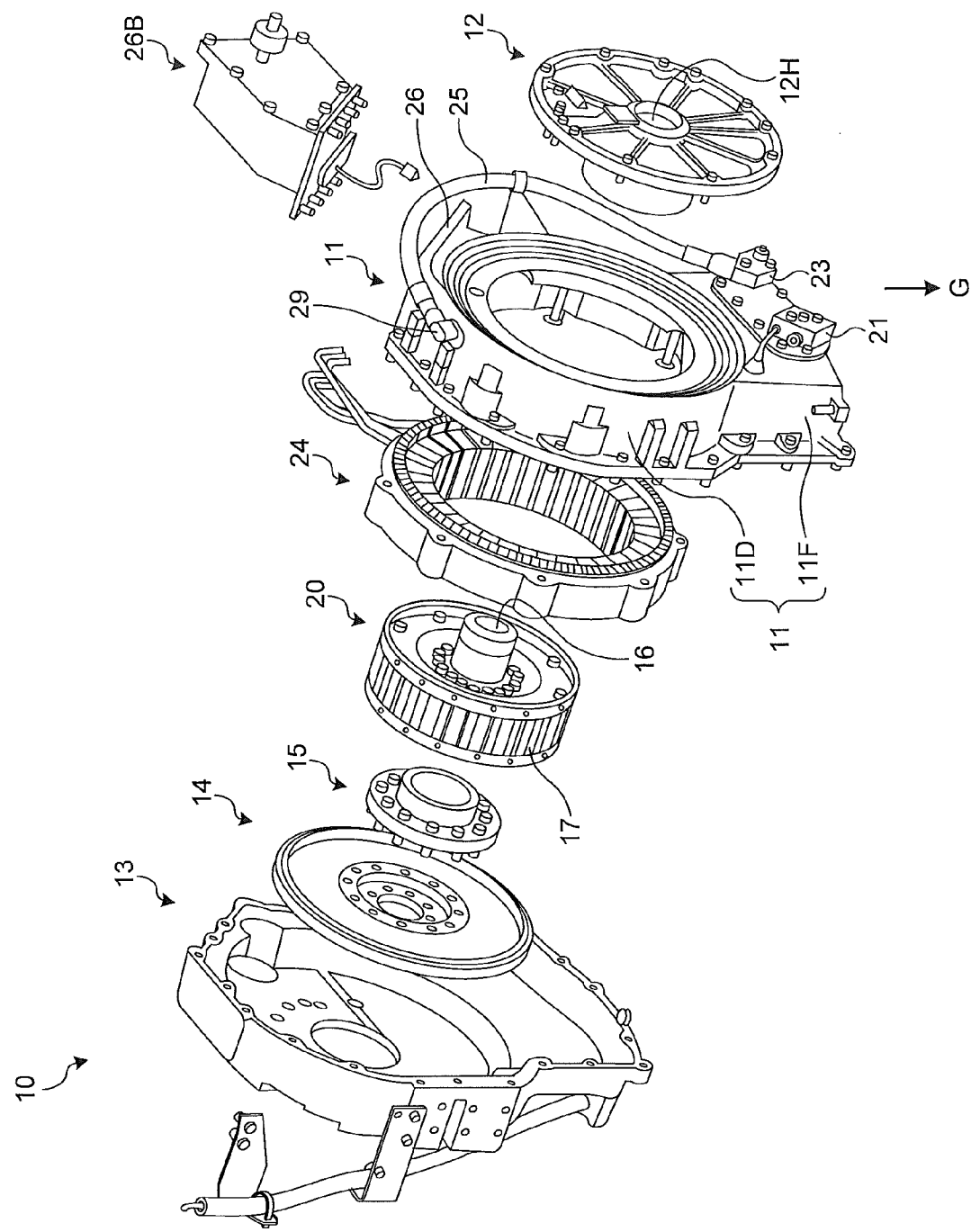
FIG. 4 is an exploded view of the generator motor according to the embodiment.
Figure 5:
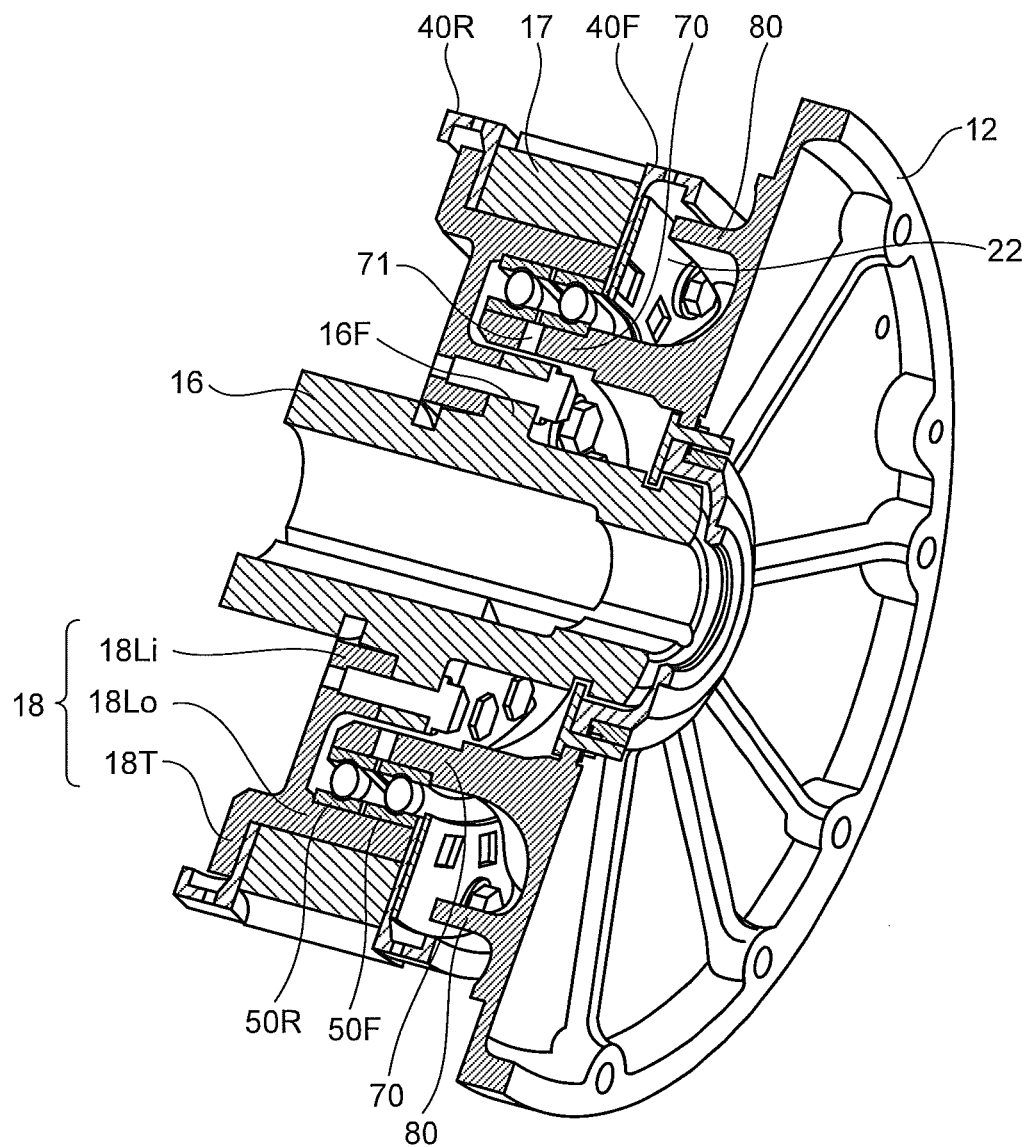
FIG. 5 is a perspective view illustrating the structures of an input/output shaft, a rotor, and a flange of the generator motor according to the embodiment.
Figure 6:
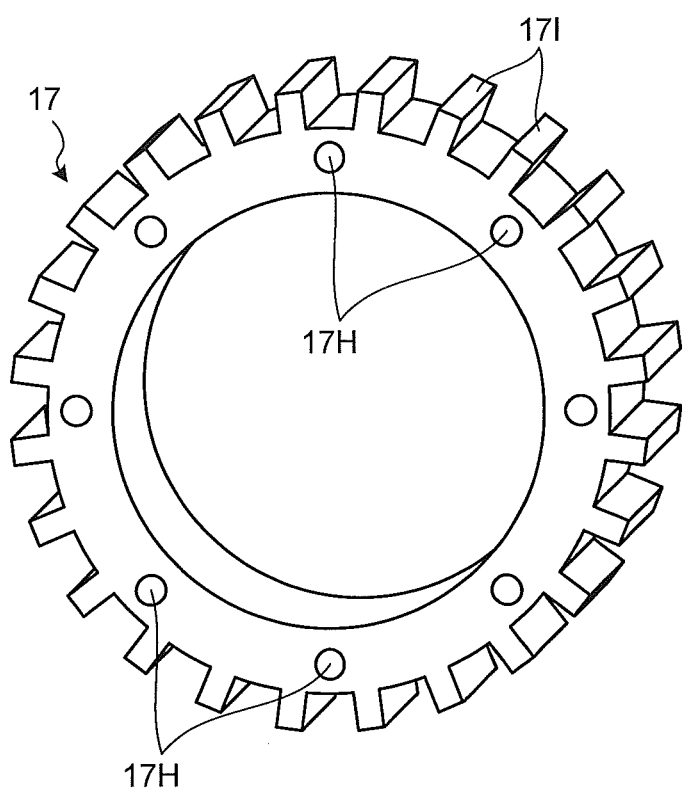
FIG. 6 is a perspective view of a rotor core provided to the generator motor according to the embodiment.
Figure 7:
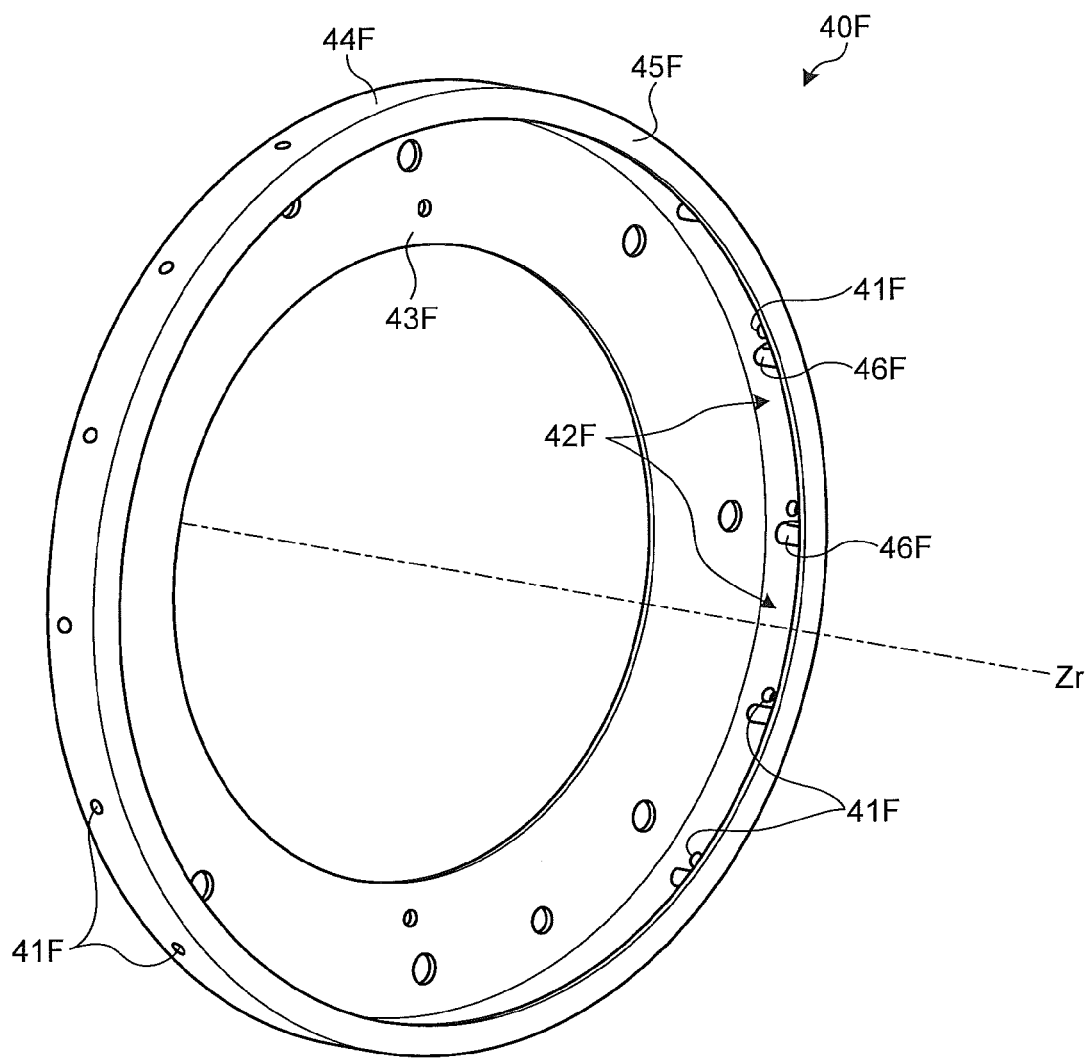
FIG. 7 is a perspective view illustrating a blade to be attached to the rotor core.
Figure 8:
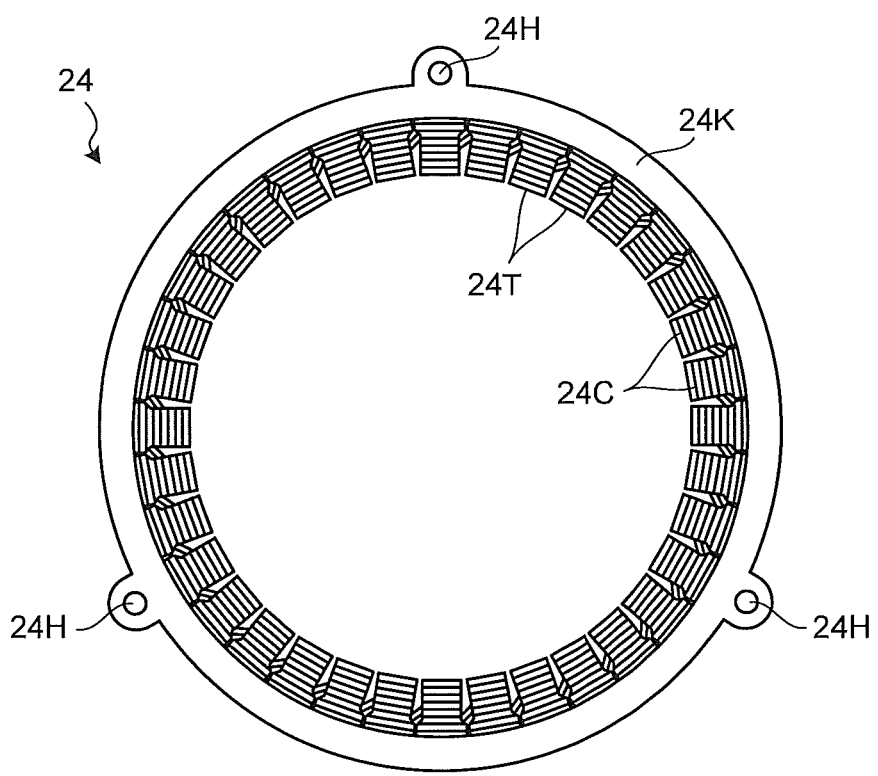
FIG. 8 is a front view of a stator provided to the generator motor according to the embodiment.
Figure 9:
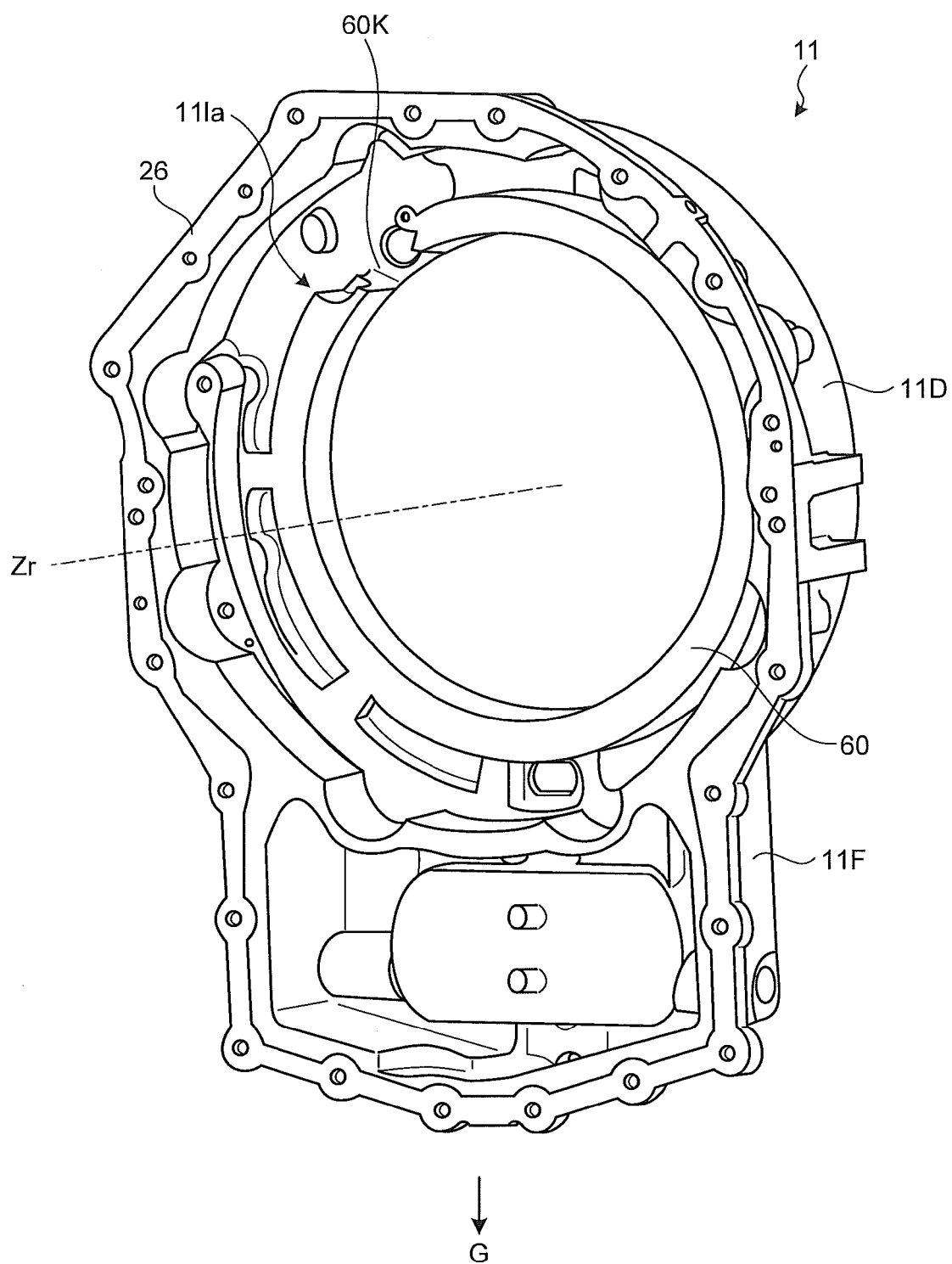
FIG. 9 is a perspective view of a first housing provided to the generator motor according to the embodiment.
Figure 10:
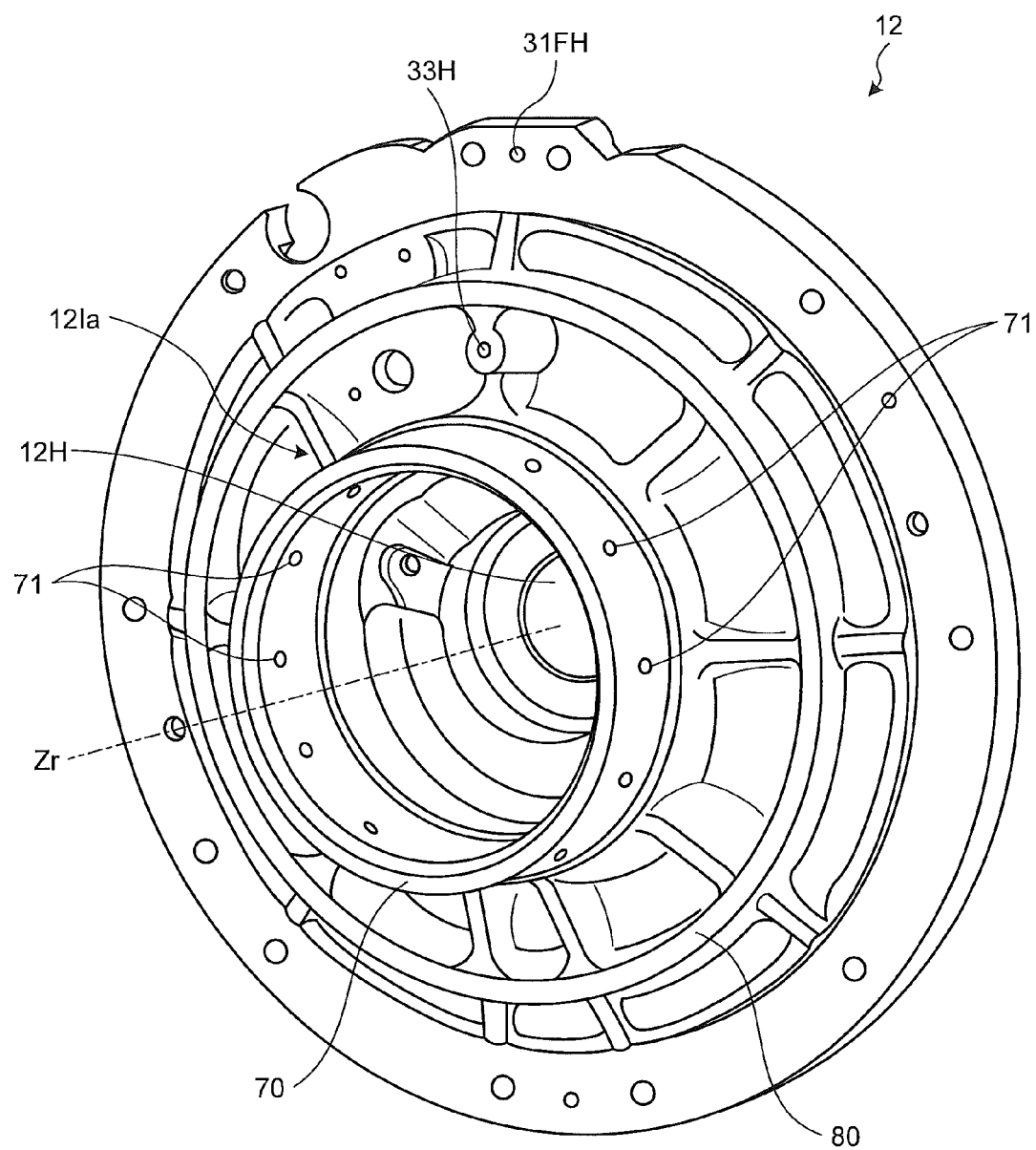
FIG. 10 is a perspective view of the flange provided to the generator motor according to the embodiment.

FIG. 3 is a cross-sectional view of the generator motor according to the embodiment. FIG. 3 illustrates a cross section of when the generator motor 10 is cut in a plane including a rotation center axis Zr of the generator motor 10 and in parallel with the rotation center axis Zr. FIG. 4 is an exploded view of the generator motor according to the embodiment. FIG. 5 is a perspective view illustrating the structures of the input/output shaft, a rotor, and a flange of the generator motor according to the embodiment. FIG. 6 is a perspective view of a rotor core provided to the generator motor according to the embodiment. FIG. 7 is a perspective view illustrating a blade to be attached to the rotor core. FIG. 8 is a front view of a stator provided to the generator motor according to the embodiment. FIG. 9 is a perspective view of a first housing provided to the generator motor according to the embodiment. FIG. 10 is a perspective view of the flange provided to the generator motor according to the embodiment.

As illustrated in FIG. 2, the generator motor 10 is placed between the internal-combustion engine 6 and the hydraulic pump 7. Electric power is generated by the power of the internal-combustion engine 6, and the power of the internal-combustion engine 6 is transmitted to the hydraulic pump 7. The generator motor 10 is cooled by a coolant such as oil, and the coolant lubricates portions requiring lubrication (sliding portions) such as bearings 50F and 50R, and a spline, which support an input/output shaft 16 rotatably.

As illustrated in FIGS. 3 and 4, the generator motor 10 includes a flywheel 14, a connection member 15, the input/output shaft 16, a rotor 20, a stator 24, a first housing 11 as a part of a housing, a flange 12 as an end side member (first end side member) to be placed at one end of the housing, that is, at one end of the first housing 11, and a second housing 13 placed at the other end of the first housing 11 to be a part of the housing.

The flywheel 14 is a disc-shaped structure, and is attached to the output shaft 6S of the internal-combustion engine 6 illustrated in FIG. 2. The flywheel 14 includes a starter gear 14G on its outer circumference. The starter gear 14G is an external ring gear. The starter gear 14G has a function of transmitting the power of a starter motor of the internal-combustion engine 6 to the output shaft 6S of the internal-combustion engine 6 to start the internal-combustion engine 6. The generator motor 10 may be operated as a motor to start the internal-combustion engine 6.

<Flywheel>

The flywheel 14 is attached to the connection member 15 with a plurality of bolts 15B. The flywheel 14 has a function of operating to improve the rotation efficiency of the internal-combustion engine 6 and a function of improving the power generation efficiency and the motor efficiency of the generator motor 10. The connection member 15 includes a substantially cylindrical main body portion 15S, and a circular flange portion 15F that overhangs outward in the radial direction of the main body portion 15S from one end side of the main body portion 15S. The flange portion 15F of the connection member 15 and the flywheel 14 are fastened with the bolts 15B to be secured. The main body portion 15S includes an internal spline 15I on its inner circumference.

<Input/Output Shaft>

The input/output shaft 16 is a cylindrical structure, and one end 16Tp is coupled to the input shaft 7S of the hydraulic pump 7, and the other end 16Te is coupled to the output shaft 6S of the internal-combustion engine 6. The input/output shaft 16 includes an internal spline 16I on its inner circumference on the one end 16Tp side and an external spline 16O on its outer circumference on the other end 16Te side. The internal spline 16I meshes with an external spline of the input shaft 7S of the hydraulic pump 7. The external spline 16O meshes with the internal spline 15I of the connection member 15. With such a structure, the power of the internal-combustion engine 6 is transmitted to the input/output shaft 16 via the flywheel 14 and the connection member 15, and the power of the internal-combustion engine 6 transmitted to the input/output shaft 16 is transmitted to the input shaft 7S of the hydraulic pump 7 via the internal spline 16I.

The input/output shaft 16 rotates about the rotation center axis Zr. The flywheel 14 and the connection member 15 also rotate about the rotation center axis Zr. The input/output shaft 16 includes a circular flange portion 16F that overhangs radially outward from its outer circumference. The flange portion 16F is a portion to which the rotor 20 to be described later is attached. Moreover, the input/output shaft 16 includes a shaft through hole 16IS that penetrates from the one end 16Tp to the other end 16Te. The shaft through hole 16IS serves as a passage of the coolant that cools the generator motor 10. The input/output shaft 16 includes grooves 16S formed on two places across its inner circumference surface from the one end 16Tp to the other end 16Te. The groove 16S becomes progressively deeper from the one end 16Tp toward the other end 16Te. With such a structure, it becomes easy for the coolant flowing from the one end 16Tp side to flow toward the other end 16Te; accordingly, cooling efficiency improves. In the embodiment, the example using the flywheel 14 has been described; however, the connection member 15 and the output shaft 6S of the internal-combustion engine 6 may be coupled with a spline or the like without using the flywheel 14.

<Rotor>

The rotor 20 includes a rotor core 17, and a rotor holder 18 as a rotor core holding member that holds the rotor core 17. The rotor core 17 is a structure where a plurality of steel sheets (magnetic steel sheets) is laminated. The direction in which the plurality of steel sheets is laminated (lamination direction) is in parallel with the rotation center axis Zr in a state where the rotor core 17 is attached to the input/output shaft 16. As illustrated in FIG. 4, the rotor core 17 is provided in a protruding manner with a plurality of (in this case, 24) inductors 17I with a predetermined pitch in the circumference direction of its outer circumference. A plurality of bolt holes 17H penetrates the rotor core 17 toward the lamination direction in the circumference direction. The inner circumference surface of the rotor core 17 is in contact with the outer circumference surface of the rotor holder 18.

The rotor holder 18 includes a first holder member 18Li, a second holder member 18Lo, and a third holder member 18T. The first holder member 18Li is the first holder member 18Li that is a hollow disc-shaped structure. The second holder member 18Lo is a cylindrical structure provided to the outer circumference of the first holder member 18Li. The third holder member 18T is a hollow disc-shaped structure provided to one end of the second holder member 18Lo, and is a structure extending outward in the radial direction of the input/output shaft 16. In the embodiment, they are manufactured of the same material integrally and inseparably. The material of the rotor holder 18 is, for example, steel, but is not limited to this. The rotor holder 18 is fastened to the flange portion 16F of the input/output shaft 16 with a bolt 16B. The rotor holder 18 rotates about the rotation center axis Zr, together with the input/output shaft 16. The first holder member 18Li includes an axial direction through hole 18P in parallel with the axial direction of the rotor holder 18 (the direction in parallel with the rotation center axis Zr). The axial direction through hole 18P serves as a passage of the coolant.

The rotor core 17 is attached to the outer circumference of the second holder member 18Lo. At this point, a rotor core mounting bolt 19 is inserted into the bolt hole 17H of the rotor core 17, and screwed in a tapped hole of the third holder member 18T; accordingly, the rotor core 17 is secured to the rotor holder 18. In the embodiment, the rotor core 17 is attached to the rotor holder 18 together with a first blade 40F and a second blade 40R in a state where the rotor core 17 is sandwiched between the first blade 40F and the second blade 40R from both sides of the lamination direction of the rotor core 17. The first blade 40F is placed on the flange 12 side, and the second blade 40R is placed on the second housing 13 side. Moreover, a sensor plate 22 to be used when the rotational speed of the input/output shaft 16 is detected is placed closer to the bolt head side of the rotor core mounting bolt 19 than the first blade 40F, and is attached to the rotor holder 18 with the rotor core mounting bolt 19. As illustrated in FIG. 5, the sensor plate 22 is a ring-shaped plate member, and includes a plurality of holes in its circumference direction. The plurality of holes is counted by an optical sensor, a magnetic sensor, or the like to detect the rotational speed of the input/output shaft 16 via the rotor holder 18.

As illustrated in FIG. 7, the first blade 40F and the second blade 40R are ring-shaped members. The first blade 40F and the second blade 40R have a function of holding the rotor core 17 including the plurality of steel sheets, and a function of suppressing the leak of magnetic flux entering the rotor core 17, the magnetic flux being produced by the stator 24. FIG. 7 illustrates only the first blade 40F; however, the second blade 40R also has a similar shape and dimensions except the placement of coolant drain holes 41F and 41R and the inside diameter of an opening of the center. Therefore, with respect to the first blade 40F and the second blade 40R, a description will be given only of the first blade 40F as necessary. The first blade 40F placed on the flange 12 side has a smaller inside diameter of the opening than the second blade 40R since the first bearing 50F and the second bearing 50R are secured thereto.

The first blade 40F includes a first portion 43F, a second portion 44F, and a third portion 45F. The first portion 43F is a hollow disc-shaped portion in contact with one end of the rotor core 17. The second portion 44F is a cylindrical portion provided on the outer circumference of the first portion 43F and extending to an opposite side to the side in contact with the rotor core 17. The inner circumference of the second portion 44F is provided with a plurality of protrusions 46F in the circumference direction. The protrusions 46F protrude radially inward from the inner circumference of the second portion 44F. In the embodiment, the protrusions 46F are placed at substantially regular intervals in the circumference direction of the second portion 44F. The third portion 45F is a flanged and hollow disc-shaped portion provided at one end on an opposite side to the end of the first portion 43F of the second portion 44F and extending toward the rotation center axis Zr. The inside diameter of the third portion 45F is larger than that of the first portion 43F.

All of the first portion 43F, the second portion 44F and the third portion 45F are manufactured of the same material integrally and inseparably. In the embodiment, the first blade 40F is manufactured by casting an aluminum alloy, for example. The first portion 43F, the second portion 44F and the third portion 45F of the first blade 40F may be manufactured as separate members, and integrated by welding, fastening with a bolt, or the like.

As illustrated in FIG. 3, the first blade 40F and the second blade 40R include coolant holding portions 42F and 42R that hold coolants on their outer circumferences. The coolant holding portion 42F is a portion surrounded by the first portion 43F, the second portion 44F, the third portion 45F and the adjacent two protrusions 46F (the same applies to the second blade 40R). The coolant holding portions 42F and 42R do not necessarily include the protrusions 46F. Moreover, the first blade 40F and the second blade 40R include the coolant drain holes 41F and 41R that penetrate radially outward on their outer circumferences. A plurality of the coolant drain holes 41F and 41R is provided in the circumference directions of the first blade 40F and the second blade 40R. The coolants held by the coolant holding portions 42F and 42R are drained from the coolant drain holes 41F and 41R by the centrifugal force caused by the rotation of the rotor 20 and released outward in the radial directions of the first blade 40F and the second blade 40R. Preferably, the coolant drain holes 41F and 41R open toward coil ends, and more preferably provided at positions facing the coil ends. By doing so, it is possible to concentrate on the coil ends upon the release of the coolants, and accordingly, it is possible to cool the coil ends more effectively.

The flywheel 14, the connection member 15, the input/output shaft 16, the rotor holder 18, the rotor core 17, the first blade 40F, the second blade 40R, the sensor plate 22, the bolts 16B and 19 that fasten them, and the like serve as rotation elements of the generator motor 10. Next, a description will be given of the stator 24.

<Stator>

The stator 24 includes a stator core 24K and a coil 24C. The coil 24C is wound around the stator core 24K via an insulator 24I attached to the stator core 24K. The stator core 24K is a ring-shaped structure where a plurality of ring-shaped steel sheets (magnetic steel sheets) is laminated. On an inner circumference of the stator core 24K, a plurality of projections 24T protrudes toward the center with a predetermined pitch in the direction of the circumference of the stator core 24K. The protrusions 24T are part of the stator core 24K. Each projection 24T is the magnetic pole of the generator motor 10. Three coils are successively wound around the circumference surface of each projection 24T via the insulator 24I, as the coil 24C. Portions extending from both ends of the stator core 24K in the lamination direction of the ring steel sheets are the coil ends of the coil 24C.

The insulator 24I is a resin member, and is interposed between the coil 24C and the stator core 24K. The insulator 24I includes a notch in a portion overlapping with a coil end of the coil 24C. The coolant released from the rotating rotor 20 reaches the coil end through the notch. In this manner, the notch of the insulator 24I can supply the coolant from the rotating rotor 20 directly to the coil end; accordingly, it is possible to cool the coil end efficiently.

In the embodiment, the stator core 24K includes 36 protrusions 24T in total. With such a structure, a 3-phase, 12-pole SR (Switched Reluctance) motor is constructed. The embodiment is not limited to this, and may be, for example, a generator motor of another type such as a PM (Permanent Magnet) motor. Six coil terminals at both ends of the three-coil 24C are electrically coupled to a terminal connection portion provided to a connector box 26B (refer to FIG. 4) attached to a connector box base 26 provided to the first housing 11. The six coil terminals are electrically coupled to the high voltage wire CAa illustrated in FIG. 2 via the terminal connection portion.

Bolt holes 24H are provided to a plurality of (three in the embodiment) protruding portions on an outer circumference of the stator core 24K. Each protruding portion is adapted to fit into a recess formed in the inner circumference of the first housing 11. The protruding portions are fit into the recesses, respectively; accordingly, it is possible to position the stator core 24K relative to the first housing 11. The positioned stator core 24K is attached to the first housing 11 by a bolt 24B penetrating through the bolt hole 24H.

The generator motor 10 has the rotor 20 placed inside the stator 24. More specifically, the rotor core 17 is placed inside the stator core 24K. With such placement, the inductors 17I provided to the rotor core 17 face the protrusions 24T provided to the stator core 24K at predetermined intervals. As described above, the number of the projections 24T provided at regular intervals on the inner circumference of the stator core 24K and constructing magnetic poles is 36 in total. On the other hand, the number of the inductors 17I provided at regular intervals on the outer circumference of the rotor core 17 is 24 in total. In this manner, the generator motor 10 has a pitch difference between the number of the magnetic poles (protrusions 24T) of the stator core 24K, in other words, the pitch between each magnetic pole (each projection 24T) and the pitch between each inductor 17I of the rotor core 17. Next, a description will be given of the first housing 11, the flange 12, and the second housing 13 of the generator motor 10.

<First Housing>

As illustrated in FIGS. 9 and 4, the first housing 11 is a structure including a substantially cylindrical portion (cylindrical portion) 11D, and an overhanging portion 11F that overhangs outward in the radial direction of the cylindrical portion 11D from the cylindrical portion 11D, and includes openings at both ends. The first housing 11 has the flange 12 attached to one end, and the second housing 13 attached to the other end. The first housing 11 includes the rotor 20 and the stator 24 placed on the outer circumference of the rotor 20 therein. More specifically, the rotor 20 and the stator 24 are placed in a space enclosed by the first housing 11, the flange 12 and the second housing 13. As illustrated in FIG. 3, the portion of the overhanging portion 11F serves as an oil pan 11P as a coolant reservoir for storing a coolant CL. The overhanging portion 11F of the first housing 11 is provided with a discharge passage 28 that causes the oil pan 11P to communicate with the outside. Moreover, it is possible to discharge the coolant in the oil pan 11P from a drain.

The first housing 11 includes a protruding portion 60 that protrudes from one end, in other words, an inner surface on the side to attach the flange 12 (flange side inner surface) 11Ia toward the stator 24. The protruding portion 60 is provided radially on the outer side than the first blade 40F attached to the rotor holder 18, and faces the coil 24C of the stator 24. The protruding portion 60 is provided along the stator 24. In other words, it is provided concentrically with the rotation center axis Zr as the center. The protruding portion 60 includes a partial notch portion 60K at a position of the connector box base 26. The conductor of the coil 24C illustrated in FIG. 3 is drawn out from the notch portion 60K. The top surface of the protruding portion 60, in other words, the surface facing the coil 24C is flat. Between the protruding portion 60 and the coil 24C is a passage through which the coolant passes. The top surface of the protruding portion 60 is placed closer to the rotor core 17 side, in other words, the coil 24C side, than the third portion 45F (refer to FIG. 7) of the first blade 40F. By doing so, it is possible to guide the coolant released from the coolant drain hole 41F of the first blade 40F to a coil end of the coil 24C. As a result, it is possible to cool a coil end more effectively.

A coolant supply port 29 is attached to a top of the first housing 11. The generator motor 10 is assumed to be used setting the overhanging portion 11F as a vertical direction (the direction in which gravity acts, the direction indicated by the arrow G in FIGS. 3 and 4) side. The top of the first housing 11 is a portion that becomes the highest from the installation plane when the overhanging portion 11F of the generator motor 10 is installed, oriented toward the vertical direction. The first housing 11 includes a coolant introduction passage 30 extending from the coolant supply port 29 toward the rotation center axis Zr of the input/output shaft 16. The first housing 11 includes a connecting passage 31H in the vicinity of the end of the coolant introduction passage 30, the connecting passage 31H extending toward and opening to the flange 12 side. The connecting passage 31H of the first housing 11 is coupled to a connecting passage 31F provided to the flange 12.

The coolant supply port 29 is coupled to a tube 25 as a coolant return passage. The coolant supplied from the coolant supply port 29 is collected in the oil pan 11P after cooling each portion of the generator motor 10. The coolant is transmitted from the discharge passage 28 to an oil cooler inlet 21 illustrated in FIG. 4 via an unillustrated filter and pump to be cooled there, and is subsequently supplied from the coolant supply port 29 again through an oil cooler outlet 23 and the tube 25. In this manner, the coolant circulates in the generator motor 10.

<Flange>

The flange 12 is attached by a plurality of bolts 12B to the opening at the one end of the first housing 11. The flange 12 is placed on the hydraulic pump 7 side which is illustrated in FIG. 2. The flange 12 includes a through hole 12H for attaching the input shaft 7S of the hydraulic pump 7 to the input/output shaft 16 of the generator motor 10, on an opposite side to the side to which the first housing 11 is attached. The input shaft 7S of the hydraulic pump 7 is attached to the input/output shaft 16 through the through hole 12H.

The flange 12 includes a bearing mounting member 70 extending outward in the radial direction of the flange portion 16F provided to the input/output shaft 16. The bearing mounting member 70 is a cylindrical member, and is integrally constructed with the flange 12 in the embodiment. The flange 12 and the bearing mounting member 70 as separate members may be integrated by fastening means such as a bolt or joint means such as welding. The bearing mounting member 70 protrudes from a surface of the flange 12 on the housing side of the generator motor 10 illustrated in FIG. 3, in other words, a surface on the first housing 11 side (housing side inner surface) 12Ia. The bearing mounting member 70 is placed between the first holder member 18Li of the rotor holder 18 and the flange portion 16F of the input/output shaft 16, and the second holder member 18Lo of the rotor holder 18.

The through hole 12H of the flange 12 includes an overhanging portion 12HF extending radially inward up to a position in the middle of the radial direction of the input/output shaft 16, or more specifically, a position in the middle of the radial direction of the internal spline 16I provided to the input/output shaft 16. The overhanging portion 12HF extends in a manner of not overlapping with the one end of the input/output shaft 16. Moreover, the inner circumference of the overhanging portion 12HF extends up to a position in the middle of the internal spline 16I. The overhanging portion 12HF guides the coolant flowing from an inside first passage 32i to the input/output shaft 16 side, and keeps the coolant flowing to the hydraulic pump 7 side through the through hole 12H to a minimum. By doing so, it is possible to keep the coolant flowing from the inside of the generator motor 10 to the outside through the through hole 12H to a minimum and guide the coolant into the generator motor 10.

As illustrated in FIGS. 3 and 5, the first bearing 50F and the second bearing 50R are attached to the outer circumference of the bearing mounting member 70 with a ring- and plate-shaped spacer 51 interposed therebetween. The spacer 51 is placed on the outer ring sides of the first bearing 50F and the second bearing 50R. In the embodiment, both of the first bearing 50F and the second bearing 50R are deep groove ball bearings, but are not limited to the deep groove ball bearings. The first bearing 50F is placed on the flange 12 side, and the second bearing 50R is placed on the second housing 13 side. In the embodiment, the inner rings of the first bearing 50F and the second bearing 50R are attached to the bearing mounting member 70. The bearing mounting member 70 is placed on the outer circumference side of the input/output shaft 16. The outer rings of the first bearing 50F and the second bearing 50R are attached to the inner circumference of the second holder member 18Lo of the rotor holder 18. With such a structure, the first bearing 50F and the second bearing 50R are interposed between the bearing mounting member 70 and the rotor holder 18. The bearing mounting member 70 supports the rotor holder 18, the input/output shaft 16, the connection member 15 and the flywheel 14 rotatably via the first bearing 50F and the second bearing 50R.

The spacer 51 is interposed between the first bearing 50F and the second bearing 50R and on their outer ring sides; accordingly, there is a gap equal to the thickness of the spacer 51 between them. The bearing mounting member 70 includes a through hole 71 opening at a position of the gap. The through hole 71 serves as a passage of the coolant and supplies the coolant to the first bearing 50F and the second bearing 50R via the gap.

The flange 12 includes a rib 80 protruding toward the first blade 40F, at a position radially on the outer side than the bearing mounting member 70 and radially on the inner side than the first blade 40F attached to the rotor holder 18. The rib 80 is a cylindrical member formed concentrically with the rotation center axis Zr as the center, and is constructed integrally with the flange 12 in the embodiment. The flange 12 and the rib 80 as separate members may be integrated by fastening means such as a bolt or joint means such as welding.

The rib 80 faces the rotor 20. The top surface of the rib 80, in other words, the surface facing the rotor 20 is flat. Between the rib 80 and the rotor 20 is a passage through which the coolant passes. The top surface of the rib 80 overlaps with a part of the first blade 40F in a direction in parallel with the rotation center axis Zr of the input/output shaft 16. In other words, the top surface of the rib 80 is closer to the rotor 20 side (the coolant holding portion 42F side) than an end face of the first blade 40F on the flange 12 side. By doing so, it is possible to more securely guide the coolant into the coolant holding portion 42F of the first blade 40F.

The flange 12 includes the connecting passage 31F coupled to the connecting passage 31H of the first housing 11, a first passage 32 coupled to the connecting passage 31F, and a second passage 33 branching off from the first passage 32. As illustrated in FIG. 10, the connecting passage 31F opens to a part of the outer circumference of the flange 12. This opening serves as an inlet 31FH of the connecting passage 31F. The first passage 32 includes an outside first passage 32o and the inside first passage 32i coupled to the outside first passage 32o and having a smaller inside diameter than the outside first passage 32o. The inside first passage 32i is placed closer to the input/output shaft 16 side than the outside first passage 32o. The inside first passage 32i of the first passage 32 opens to the input/output shaft 16 side of the flange 12, more specifically, a portion where a part of the input/output shaft 16 overlaps with the flange 12 in the rotation center axis Zr direction. The opening on the input/output shaft 16 side of the inside first passage 32i is a first passage outlet 32H.

The second passage 33 branches off from the outside first passage 32o. In other words, the second passage 33 branches off before the inside diameter of the first passage 32 becomes smaller. The second passage 33 extends toward the rotor 20 attached to the outside of the input/output shaft 16 and opens to the rotor 20 side of the flange 12. The portion branching off from the first passage 32 is a second passage inlet 33I, and the opening on the rotor 20 side of the second passage 33 is a second passage outlet 33H (refer to FIGS. 3 and 10).

<Second Housing>

The second housing 13 is attached at the opening of the other end of the first housing 11. The second housing 13 is placed on the internal-combustion engine 6 side, the internal-combustion engine 6 being illustrated in FIG. 2. The second housing 13 includes a through hole 13H for attaching the output shaft 6S of the internal-combustion engine 6 to the input/output shaft 16 of the generator motor 10, on an opposite side to a side to which the first housing 11 is attached. The output shaft 6S of the internal-combustion engine 6 is attached to the flywheel 14 through the through hole 13H. Next, a description will be given of the route of the coolant in the generator motor 10.

<Route of Coolant>

The coolant having flowed from the coolant supply port 29 flows into the first passage 32 through the coolant introduction passage 30, and the connecting passages 31H and 31F. Part of the coolant having flowed into the first passage 32 branches into the second passage 33, and the rest flows into the inside first passage 32i, and flows out from the first passage outlet 32H. Part of the coolant flowed from the first passage outlet 32H flows into the shaft through hole 16IS from between the internal spline 16I of the input/output shaft 16 and the external spline of the input shaft 7S of the hydraulic pump 7 illustrated in FIG. 2. The rest passes through spaces between the input/output shaft 16 and the flange 12, and between the input/output shaft 16 and the bearing mounting member 70, and flows into the gap between the first bearing 50F and the second bearing 50R from the through hole 71 of the bearing mounting member 70.

It is preferable that the first passage outlet 32H should open at a position of the one end 16Tp of the input/output shaft 16. In other words, it is preferable that the first passage outlet 32H should open at a position of the coupling portion of the input/output shaft 16 and the input shaft 7S of the hydraulic pump 7 being an object to be driven by the internal-combustion engine 6. By doing so, it is possible to supply the coolant between the input/output shaft 16 and the input shaft 7S of the hydraulic pump 7, or more specifically, between the internal spline 16I of the input/output shaft 16 and the external spline of the input shaft 7S of the hydraulic pump 7 illustrated in FIG. 2. As a result, it is possible to efficiently introduce the coolant into the shaft through hole 16IS. Moreover, as described above, the overhanging portion 12HF provided to the through hole 12H of the flange 12 is regulated so as to prevent the coolant coming out from the first passage outlet 32H from flowing to the hydraulic pump 7 side; accordingly, it is possible to efficiently introduce the coolant into the shaft through hole 16IS.

The coolant having flowed into the gap between the first bearing 50F and the second bearing 50R cools and lubricates the first bearing 50F and the second bearing 50R. Part of the coolant subsequently flows in between the bearing mounting member 70 and the rib 80. The rest of the coolant passes through the axial direction through hole 18P provided to the first holder member 18Li of the rotor holder 18. The coolant having flowed in between the bearing mounting member 70 and the rib 80 flows into the coolant holding portion 42F of the first blade 40F and subsequently flows out from the coolant drain hole 41F of the coolant holding portion 42F. The coolant is released outward in the radial direction of the rotor 20 due to the centrifugal force caused by the rotation of the rotor 20 and is dispersed on a coil end of the coil 24C for cooling. The coolant having cooled the coil end is collected in the oil pan 11P.

The coolant CL having passed through the axial direction through hole 18P provided to the first holder member 18Li flows along the third holder member 18T of the rotor holder 18, then flows into the coolant holding portion 42R of the second blade 40R, and flows out from the coolant drain hole 41R of the coolant holding portion 42R. The coolant CL is released outward in the radial direction of the rotor 20 due to the centrifugal force caused by the rotation of the rotor 20 and is dispersed on a coil end of the coil 24C for cooling. The coolant having cooled the coil end is collected in the oil pan 11P.

The coolant having flowed into the shaft through hole 16IS flows from the one end 16Tp to the other end 16Te of the input/output shaft 16, and flows out from the other end 16Te. The coolant passes between the external spline 16O of the input/output shaft 16 and the internal spline 15I of the connection member 15, and flows between the connection member 15 and the rotor holder 18. The coolant flows radially outward along the first holder member 18Li and the third holder member 18T of the rotor holder 18, and subsequently flows into the coolant holding portion 42R of the second blade 40R, and flows out from the coolant drain hole 41R of the coolant holding portion 42R. The coolant is released outward in the radial direction of the rotor 20 due to the centrifugal force caused by the rotation of the rotor 20 and is dispersed on a coil end of the coil 24C for cooling. The coolant having cooled the coil end is collected in the oil pan 11P.

The coolant having passed through the second passage 33 flows out from the second passage outlet 33H and flows toward the rotor 20. The coolant having reached the rotor 20 is released outward in the radial direction of the rotor 20 due to the centrifugal force caused by the rotation of the rotor 20, and is dispersed on a coil end of the coil 24C on the flange 12 side for cooling. The coolant having cooled the coil end flows downward by the action of gravity, and is collected in the oil pan 11P. The coolant having been collected in the oil pan 11P is sent from the discharge passage 28 to the oil cooler inlet 21 illustrated in FIG. 4 via an unillustrated filter and pump, and is cooled there, and is subsequently supplied from the coolant supply port 29 again through the oil cooler outlet 23 and the tube 25.

The coolant flowing through the outside first passage 32o has a downward speed; accordingly, even if the first passage 32 and the second passage 33 are the same in the passage cross-sectional area (the area of the cross section orthogonal to the passage extension direction), the flow rate of the coolant flowing through the first passage 32 is higher than that of the coolant flowing through the second passage 33. As a result, variations of cooling states occur between a portion cooled by the coolant passing through the second passage 33 and a portion cooled by the coolant passing through the first passage 32. Specifically, a coil end of the coil 24C on the flange 12 side and closer to the top side than the rotation center axis Zr is difficult to be cooled compared with a coil end of the coil 24C in the other portion, and its temperature increases easily. Hence, the embodiment suppresses variations of cooling states with the following cooling structure.

Figure 11:
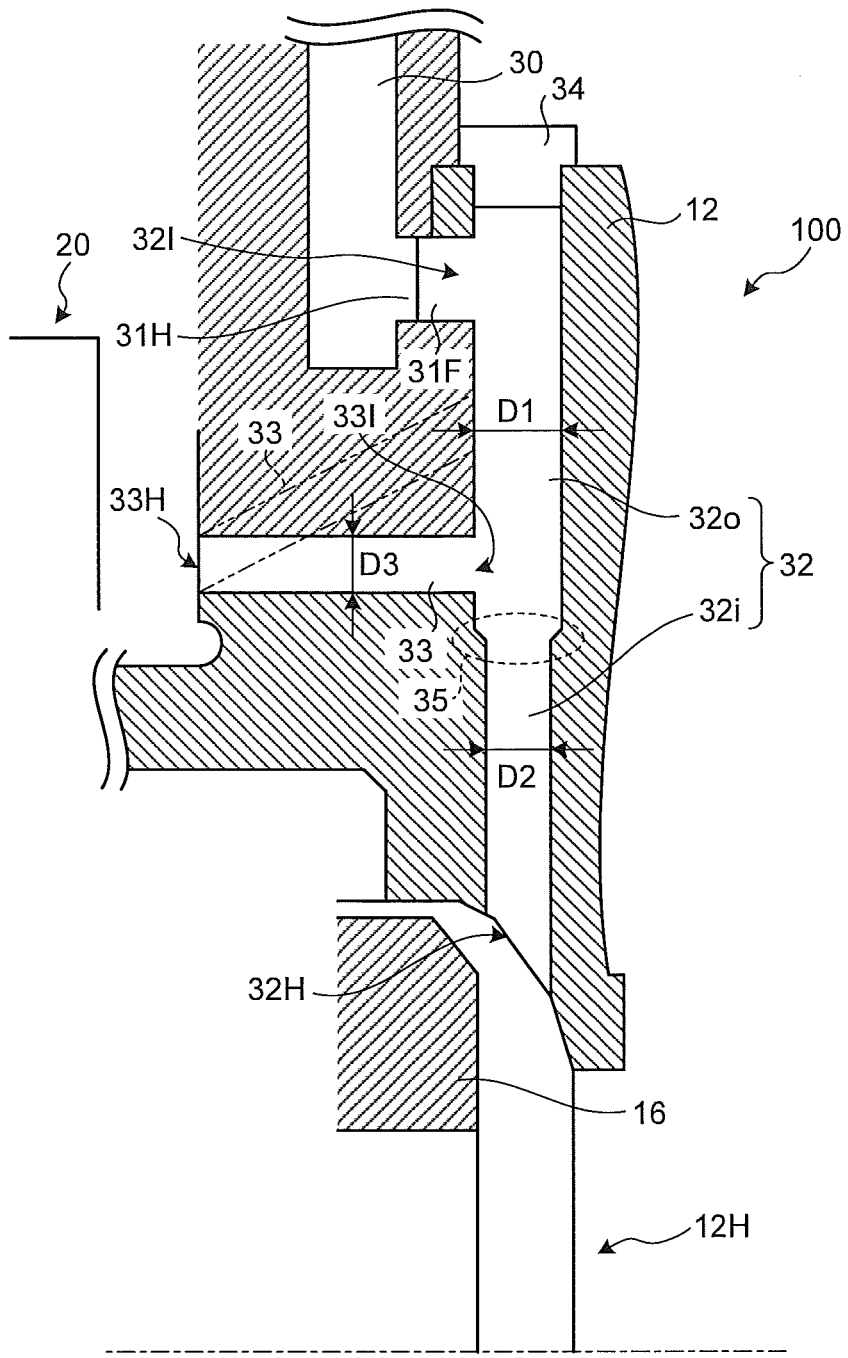
FIG. 11 is a view illustrating a cooling structure of a generator motor according to the embodiment.

FIG. 11 is a view illustrating a cooling structure of a generator motor according to the embodiment. A cooling structure 100 of a generator motor according to the embodiment (hereinafter referred to as the cooling structure as necessary) reduces the difference in the flow rates of coolants between the first passage and the second passage 33 upon dividing the coolant into two direction in the first passage 32. Therefore, the cooling structure 100 has the first passage 32 that extends toward the rotation center axis Zr of the input/output shaft 16 housed in the first housing 11 as a part of the housing of the generator motor 10 and opens to the input/output shaft 16 side, and includes a restriction section 35 halfway through. The second passage 33 branches off from the first passage 32 at a position on the outer side in the radial direction of the input/output shaft than the restriction section 35, extends toward the rotor 20 attached to the outside of the input/output shaft 16, and opens at a position facing the rotor 20.

With such a structure, the flow rate of the coolant passing through the restriction section 35 and flowing through the first passage 32 decreases, and the flow rate of the coolant flowing through the second passage 33 increases. As a result, it is possible to reduce the difference between the flow rates of the coolants flowing through the first passage 32 and the second passage 33. As a result, it is possible to suppress variations of cooling states between a portion cooled by the coolant passing through the second passage 33 and a portion cooled by the coolant passing through the first passage 32. If an inside diameter D1 of the first passage 32 increases and then the flow rate of the coolant flowing through the first passage 32 increases, the difference between the flow rates of the coolants flowing through the first passage 32 and the second passage 33 increases. The cooling structure 100 can adjust the balance of the flow rates between the coolant flowing through the first passage 32 and the coolant flowing through the second passage 33 by adjusting the level of restriction by the restriction section 35; accordingly, there is a high degree of freedom in adjustment. Therefore, the cooling structure 100 is advantageous especially if the inside diameter D1 of the first passage 32 increases and then a large amount of coolant needs to flow therethrough.

In the embodiment, an inside diameter D2 of the inside first passage 32i is made smaller than the inside diameter D1 of the outside first passage 32o (D2<D1), and the restriction section 35 is set to be between the inside first passage 32i and the outside first passage 32o. An inside diameter D3 of the second passage 33 can be set as appropriate, but is made equal to D2 in the embodiment.

The inside diameter D2 of the inside first passage 32i is made smaller than the inside diameter D1 of the outside first passage 32o to provide the restriction section 35 relatively easily. The first passage 32 is formed by, for example, boring a hole through the flange 12 with a drill or the like; however, firstly, the outside first passage 32o is formed by being bored with a drill having an outside diameter equal to the inside diameter D1 of the outside first passage 32o. Next, the inside first passage 32i is formed with a drill of the inside diameter D2 (<D1) of the inside first passage 32i. Lastly, the second passage 33 is formed by being bored from the rotor 20 side of the flange 12 toward the outside first passage 32o. In this manner, it is possible to form the first passage 32 having the restriction section 35 by boring a hole with drills having different outside diameters. In this method, another opening of the first passage 32 is created other than the first passage outlet 32H; accordingly, the opening other than the first passage outlet 32H is sealed with a plug 34.

In some cases, it is difficult to bore a long hole for the inside first passage 32i having a small diameter first, from the viewpoint of machining. As described above, the outside first passage 32o having a large diameter is bored first. The inside first passage 32i having a smaller inside diameter is subsequently bored. Accordingly, it is possible to shorten the distance to bore a small hole. Therefore, according to the above-mentioned method, it is possible to easily process the inside first passage 32i having a smaller inside diameter than the inside diameter of the outside first passage 32o. The boring order of the inside first passage 32i and the outside first passage 32o is not excluded.

The coolant introduction passage 30 and the connecting passages 31H and 31F can also be formed by being bored with a drill. The coolant having passed through the coolant introduction passage 30 and the connecting passages 31H and 31F flows into the outside first passage 32o through a first passage inlet 32I, and branches off into the second passage 33 at the second passage inlet 33I, and the rest flows through the inside first passage 32i. In the cooling structure 100, the amount of the coolant flowing into the inside first passage 32i is restricted by the restriction section 35; accordingly, a larger amount of coolant flows into the second passage 33 and flows out from the second passage outlet 33H. As a result, the cooling structure 100 can suppress the difference between the flow rates of the coolants flowing through the first passage 32 and the second passage 33 and suppress variations of cooling states. Moreover, the cooling structure 100 sets the balance of the flow rates between the first passage 32 and the second passage 33 by the restriction section 35; accordingly, even if the flow rate of the coolant supplied to the coolant introduction passage 30 changes or the viscosity of the coolant changes, it becomes easier to maintain the constant ratio of the flow rates of the first passage 32 and the second passage 33.

Moreover, the generator motor 10 has a function of transmitting the power of the internal-combustion engine 6 to the hydraulic pump 7. At this point, if the torque of when passing through the input/output shaft 16 is increased due to the specification of the internal-combustion engine 6 or the hydraulic pump 7, or the like, it is necessary to change the flow rate ratios of the first passage 32 and the second passage 33. Even in such a case, it is possible to easily change the above-mentioned flow rate ratio by changing the ratio of the inside diameter D2 of the outside first passage 32o and the inside diameter D1 of the inside first passage 32i. Therefore, the cooling structure 100 is suitable for those having the function of transmitting power from a power generation source to a driving source other than the generator motor 10.

In the embodiment, the first passage 32 extends in parallel with the radial direction of the input/output shaft 16. If extending toward the input/output shaft 16, it is not necessary for the first passage 32 to be in parallel with the radial direction of the input/output shaft 16. Moreover, the first passage 32 may include a curve. However, the first passage 32 can easily be formed by making the first passage 32 straight as in the embodiment.

In the embodiment, the second passage 33 is formed in parallel with the rotation center axis Zr of the input/output shaft 16. It is sufficient if the second passage 33 extends from the first passage 32 toward the rotor 20; accordingly, the second passage 33 may not be in parallel with the rotation center axis Zr. Therefore, the second passage 33 may extend toward the rotor 20 and the rotation center axis as indicated by the chain double-dashed line of FIG. 11. Moreover, the second passage 33 branches off from the outside first passage 32o at a predetermined position away from the restriction section 35, in other words, at a position radially outward away from the inlet of the inside first passage 32i by a predetermined distance, and extends toward the rotation center axis Zr of the input/output shaft 16.

The shapes of the cross sections orthogonal to the extension directions of the first passage 32 and the second passage 33 are not limited, and may be a polygon such as a triangle, square or hexagon in addition to a circle, ellipse or the like. However, it is preferable that both shapes of the cross sections of the first passage 32 and the second passage 33 are made circular; accordingly, the first passage 32 and the second passage 33 can be bored with a drill and formed easily. If the shape of the cross section is other than a circle, an equivalent diameter (4×A/C, where A is the area of a passage cross section and C is the circumference of the passage cross section) is used for the inside diameters of the first passage 32 and the second passage 33.

Figure 12:
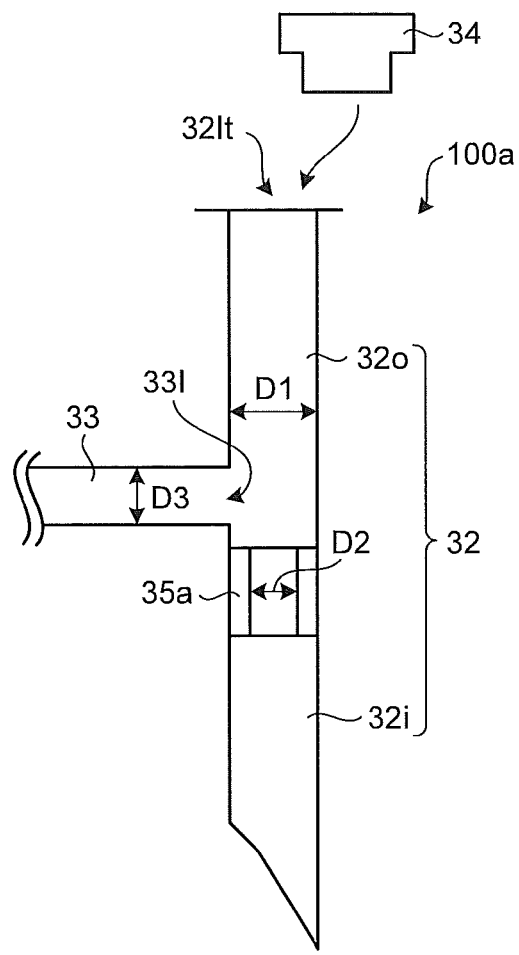
FIG. 12 is a view illustrating a cooling structure of a generator motor according to Modification of the embodiment.
Figure 13:
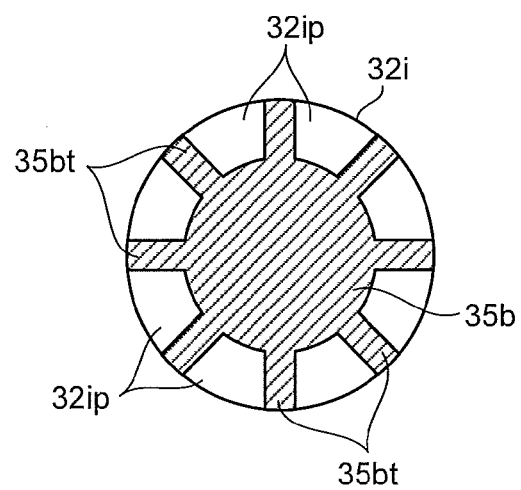
FIG. 13 is a view illustrating the cooling structure of a generator motor according to Modification of the embodiment.

FIGS. 12 and 13 are views illustrating a cooling structure of a generator motor according to Modification of the embodiment. In a cooling structure 100a illustrated in FIG. 12, a restriction section is formed using a sleeve 35a having an inside diameter of D2. The sleeve 35a is inserted into the first passage 32 from an opening 32It on an opposite side to the first passage outlet 32H of the first passage 32, and is attached thereto. The plug 34 is attached at the opening 32It. The sleeve 35a is attached at a position where an end on the opening 32It side is closer to the first passage outlet 32H side than the second passage inlet 33I. The sleeve 35a is made out of, for example, a material softer than that of the flange 12 where the first passage 32 is formed. The sleeve 35a is driven into the first passage 32 to be attached at a predetermined position of the first passage 32. The cooling structure 100a does not need to change the inside diameter D1 between the outside first passage 32o and the inside first passage 32i, which facilitates processing accordingly. An external spline-shaped passage cross-sectional area adjustment member 35b illustrated in FIG. 13 may be used as a restriction section instead of the sleeve 35a. In this case, the coolant passes through a space 32ip enclosed by an external spline 35bt and the inside first passage 32i.

As described above, the embodiment and its modification is adapted to include a first passage that extends toward the rotation center axis of an input/output shaft of a generator motor, opens to the input/output shaft side, and includes a restriction section halfway through, and a second passage that branches off from the first passage at a position on the outer side in the radial direction of the input/output shaft than the restriction section and then extends toward a rotor attached to the outside of the input/output shaft, and opens to the rotor side. In this manner, the restriction section is provided to the first passage, and the second passage is branched off on the upper reach side of the flow of a coolant than the restriction section; accordingly, the flow rate of the coolant flowing through the lower reach of the first passage than the restriction section is reduced, and the flow rate of the coolant flowing through the second passage can be increased accordingly. As a result, the unbalanced flow rates of the coolants in the first and second passages are suppressed, and accordingly it is possible to suppress variations of the cooling states of portions to be cooled of the generator motor.

REFERENCE SIGNS LIST

1 Hybrid excavator
2 Undercarriage
3 Upper structure
6 Internal-combustion engine
6S Output shaft
7 Hydraulic pump
7S Input shaft
10 Generator motor
11 First housing
12 Flange
13 Second housing
14 Flywheel
15 Connection member
16 Input/output shaft
17 Rotor core
18 Rotor holder
18Li First holder member
18Lo Second holder member
18T Third holder member
20 Rotor
24 Stator
24C Coil
24I Insulator
24K Stator core
32 First passage
32i Inside first passage
32o Outside first passage 32H First passage outlet
32I First passage inlet
33 Second passage
33H Second passage outlet
33I Second passage inlet
35 Restriction section
40F First blade
40R Second blade
50F First bearing
50R Second bearing
60 Protruding portion
70 Bearing mounting member
71 Through hole
80 Rib
100, 100a Cooling structure
Zr Rotation center axis

The invention claimed is:

1. A cooling structure of a generator motor comprising:
a first passage provided to an end side member placed at one end of a housing of a generator motor, the first passage extending toward a rotation center axis of an input/output shaft housed in the housing, the first passage opening to a side of the input/output shaft, and the first passage including a restriction section halfway through; and
a second passage provided to the end side member, branching off from the first passage at a position on an outer side in a radial direction of the input/output shaft than the restriction section and subsequently extending toward a rotor attached to an outside of the input/output shaft, and the second passage opening to a side of the rotor,
wherein a coolant is supplied from an outer side in the radial direction of the input/output shaft than a position at which the second passage is branched off from the first passage in the first passage, and
the second passage is branched off on an upper reach side of a flow of the coolant than the restriction section.

2. The cooling structure of a generator motor according to claim 1, wherein
the first passage includes:
an inside first passage on the side of the input/output shaft; and
an outside first passage placed on an outer side in the radial direction of the input/output shaft than the inside first passage, and having a larger inside diameter than the inside first passage, and
the restriction section is between the inside first passage and the outside first passage.

3. The cooling structure of a generator motor according to claim 1, wherein the first passage opens at a position at one end of the input/output shaft.

4. The cooling structure of a generator motor according to claim 1, wherein the end side member includes:
a through hole for attaching a power transmission member to the input/output shaft; and
an overhanging portion extending toward the rotation center axis from an inner circumference of the through hole to a middle position in the radial direction of the input/output shaft in a manner of not overlapping with one end of the input/output shaft.

5. A generator motor comprising a cooling structure of a generator motor, the cooling structure of a generator motor comprising:
a first passage provided to an end side member placed at one end of a housing of a generator motor, the first passage extending toward a rotation center axis of an input/output shaft housed in the housing, the first passage opening to a side of the input/output shaft, and the first passage including a restriction section halfway through; and
a second passage provided to the end side member, branching off from the first passage at a position on an outer side in a radial direction of the input/output shaft than the restriction section and subsequently extending toward a rotor attached to an outside of the input/output shaft, and the second passage opening to a side of the rotor,
wherein a coolant is supplied from an outer side in the radial direction of the input/output shaft than a position at which the second passage is branched off from the first passage in the first passage, and
the second passage is branched off on an upper reach side of a flow of the coolant than the restriction section.

6. The generator motor according to claim 5, wherein in the generator motor,
one end of the input/output shaft is coupled to an output shaft of a power generation source, and
the other end of the input/output shaft is coupled to an input shaft of an object to be driven by power of the power generation source.

7. A generator motor comprising a cooling structure of a generator motor, the cooling structure of a generator motor comprising:
a first passage provided to an end side member placed at one end of a housing of a generator motor, the first passage extending toward a rotation center axis of an input/output shaft housed in the housing, the first passage opening to a side of the input/output shaft, and the first passage including a restriction section halfway through; and
a second passage provided to the end side member, branching off from the first passage at a position on an outer side in a radial direction of the input/output shaft than the restriction section and subsequently extending toward a rotor attached to an outside of the input/output shaft, and the second passage opening to a side of the rotor,
wherein the first passage opens at a position of a coupling portion at which the input/output shaft and the input shaft of the object to be driven are coupled.

8. A generator motor, provided between an internal-combustion engine and a hydraulic pump, for transmitting power of the internal-combustion engine to the hydraulic pump and generating electric power, the generator motor comprising:
a first passage provided to an end side member placed at one end of a housing of the generator motor, the first passage extending toward a rotation center axis of an input/output shaft housed in the housing, the first passage opening to a side of the input/output shaft, and the first passage including a restriction section halfway through; and
a second passage branching off from the first passage at a position on an outer side in a radial direction of the input/output shaft than the restriction section and subsequently extending toward a rotor attached to an outside of the input/output shaft, and the second passage opening to a side of the rotor, wherein
the first passage includes
an inside first passage on the side of the input/output shaft, and
an outside first passage placed on an outer side in the radial direction of the input/output shaft than the inside first passage, and having a larger inside diameter than the inside first passage, and
the second passage branches off from the outside first passage.

* * * * *